United States Patent
Someya et al.

(10) Patent No.: US 11,434,342 B2
(45) Date of Patent: Sep. 6, 2022

(54) RESIN FOR FOAM MOLDING, FOAM MOLDED ARTICLE, AND METHOD FOR PRODUCING FOAM MOLDED ARTICLE

(71) Applicant: KYORAKU CO., LTD., Kyoto (JP)

(72) Inventors: Takaaki Someya, Yamato (JP); Takeru Sano, Yamato (JP)

(73) Assignee: KYORAKU CO., LTD.

( * ) Notice: Subject to any disclaimer, the term of this patent is extended or adjusted under 35 U.S.C. 154(b) by 330 days.

(21) Appl. No.: 16/640,076

(22) PCT Filed: Aug. 23, 2018

(86) PCT No.: PCT/JP2018/031131
§ 371 (c)(1),
(2) Date: Feb. 19, 2020

(87) PCT Pub. No.: WO2019/044650
PCT Pub. Date: Mar. 7, 2019

(65) Prior Publication Data
US 2021/0130563 A1    May 6, 2021

(30) Foreign Application Priority Data

Aug. 30, 2017  (JP) .............................. JP2017-165925

(51) Int. Cl.
| *C08J 9/12* | (2006.01) |
| *C08L 23/06* | (2006.01) |
| *C08J 9/00* | (2006.01) |
| *B29C 44/50* | (2006.01) |
| *B29K 23/00* | (2006.01) |

(52) U.S. Cl.
CPC ........... *C08J 9/0061* (2013.01); *B29C 44/507* (2016.11); *C08J 9/122* (2013.01); *C08L 23/06* (2013.01); *B29K 2023/065* (2013.01); *B29K 2023/0633* (2013.01); *C08J 2201/03* (2013.01); *C08J 2203/06* (2013.01); *C08J 2323/06* (2013.01); *C08L 2205/025* (2013.01); *C08L 2207/062* (2013.01); *C08L 2207/066* (2013.01)

(58) Field of Classification Search
CPC ...... C08J 9/0061; C08J 9/122; C08J 2201/03; C08J 2203/06; C08J 2323/06; C08J 9/04; C08J 9/12; B29C 44/507; B29C 48/0017; B29C 48/09; B29C 48/34; B29C 48/475; B29C 48/80; B29C 49/0005; B29C 49/04; B29C 48/0012; C08L 23/06; C08L 2205/025; C08L 2207/062; C08L 2207/066; C08L 23/04; B29K 2023/0633; B29K 2023/065; B29K 2101/12; B29K 2105/0094; B29K 2105/04; B29L 2023/22

See application file for complete search history.

(56) References Cited

U.S. PATENT DOCUMENTS

| 2002/0086946 | A1 | 7/2002 | Abe |
| 2009/0176902 | A1 | 7/2009 | Stadlbauer et al. |
| 2014/0187730 | A1 | 7/2014 | Flory et al. |
| 2015/0045468 | A1 | 2/2015 | Onodera |
| 2015/0126634 | A1 | 5/2015 | Shirodkar et al. |
| 2018/0215885 | A1* | 8/2018 | Someya ................. B29C 49/04 |

FOREIGN PATENT DOCUMENTS

| JP | 2002-327011 A | 11/2002 |
| JP | 2009-132903 A | 6/2009 |
| JP | 2010-038565 A | 2/2010 |
| JP | 2011-001545 A | 1/2011 |
| JP | 2012-067256 A | 4/2012 |
| JP | 2012-211312 A | 11/2012 |
| JP | 2013-124300 A | 6/2013 |
| JP | 2014-046549 A | 3/2014 |
| JP | 2014-058624 A | 4/2014 |
| JP | 2014-517135 A | 7/2014 |
| JP | 2015-172210 A | 10/2015 |
| JP | 2015-196711 A | 11/2015 |
| JP | 2015-227459 A | 12/2015 |
| JP | 2017-039812 A | 2/2017 |
| WO | 2013/114996 A1 | 8/2013 |

OTHER PUBLICATIONS

International Search Report dated Nov. 20, 2018 of corresponding International Application No. PCT/JP2018/031131; 2 pgs.
Extended European Search Report dated Sep. 4, 2020, of corresponding European Application No. 18852161.1; 8 pages.
Japanese Office Action dated Apr. 6, 2021, in connection with corresponding JP Application No. 2017-165925 (18 pp., including machine-generated English translation).

\* cited by examiner

*Primary Examiner* — Irina S Zemel
(74) *Attorney, Agent, or Firm* — Maier & Maier, PLLC

(57) ABSTRACT

According to the present invention, provided is a foam molding resin containing low-density polyethylene, wherein a strain hardening degree of the low-density polyethylene is equal to or more than 0.40.

8 Claims, 6 Drawing Sheets

RESIN FOR FOAM MOLDING, FOAM MOLDED ARTICLE, AND METHOD FOR PRODUCING FOAM MOLDED ARTICLE

TECHNICAL FIELD

The present invention relates to a foam molding resin, a foam molded article, and a method for producing a foam molded article.

BACKGROUND ART

A tubular air conditioning duct for passing air is used, for example, in an air conditioner of an automobile and the like.

A foam molded article using a foamed resin obtained by foaming thermoplastic resin with a foaming agent is known as an air conditioning duct. The foam molded article can achieve both of high heat insulation and light weight, and the demand therefor is increasing.

A widely known method for producing such a foam molded article is a blow molding method in which foamed resin in a molten state is clamped with a split mold, and air is blown into the interior to expand the resin.

Patent Literature 1 discloses a technique for increasing an expansion ratio of the foam molded article in foam molding, in which melt tension (MT) and MT×melt flow rate (MFR) are respectively increased to a predetermined value or higher.

CITATION LIST

Patent Literature

[Patent Literature 1] JP-A-2012-067256

SUMMARY OF INVENTION

Technical Problem

A standard disclosed in Patent Literature 1 can be applied to various kinds of raw material resin. However, as a result of investigating a relationship of MT and MT×MFR to the expansion ratio of the obtained foam molded article for low-density polyethylene (LDPE) used as a raw material for foam molding, it has been found that the expansion ratio may be lowered although both MT and MT×MFR values are relatively high.

The present invention has been made in view of such circumstances and provides a foam molding resin containing LDPE capable of raising the expansion ratio.

Solution to Problems

According to the present invention, provided is a foam molding resin containing low-density polyethylene, wherein a strain hardening degree of the low-density polyethylene is equal to or more than 0.40.

As a result of intensive studies by the present inventors, It has been found that the foam molded article having a high expansion ratio can be obtained when the strain hardening degree of LDPE is equal to or more than 0.40, and the present invention has been derived therefrom.

Hereinafter, various embodiments of the present invention are exemplified. The following embodiments can be combined with each other.

Preferably, the foam molding resin further contains high-density polyethylene.

Preferably, a mass ratio of the low-density polyethylene and the high-density polyethylene is 2:8 to 8:2.

Preferably, melt tension of the low-density polyethylene is equal to or more than 250 mN.

Preferably, shear viscosity of the low-density polyethylene is equal to or more than 450 Pa·s.

According to another viewpoint of the present invention, provided is a foam molded article obtained by molding the above-mentioned foam molding resin.

According to another viewpoint of the present invention, provided is a method for producing a foam molded article, comprising steps of: extruding, from a foam extruder, a melt-kneaded resin obtained by melt-kneading the above-mentioned foam molding resin and a foaming agent in the foam extruder to form a foamed parison; and molding the foamed parison to obtain the foam molded article.

DESCRIPTION OF EMBODIMENTS

Hereinafter, embodiments of the present invention will be described. Various characteristics described in the following embodiments can be combined with each other. In addition, the invention is independently established for each characteristic.

1. Foam Molding Resin

A foam molding resin of an embodiment of the present invention contains LDPE having a strain hardening degree of 0.40 or more.

Figure 1:
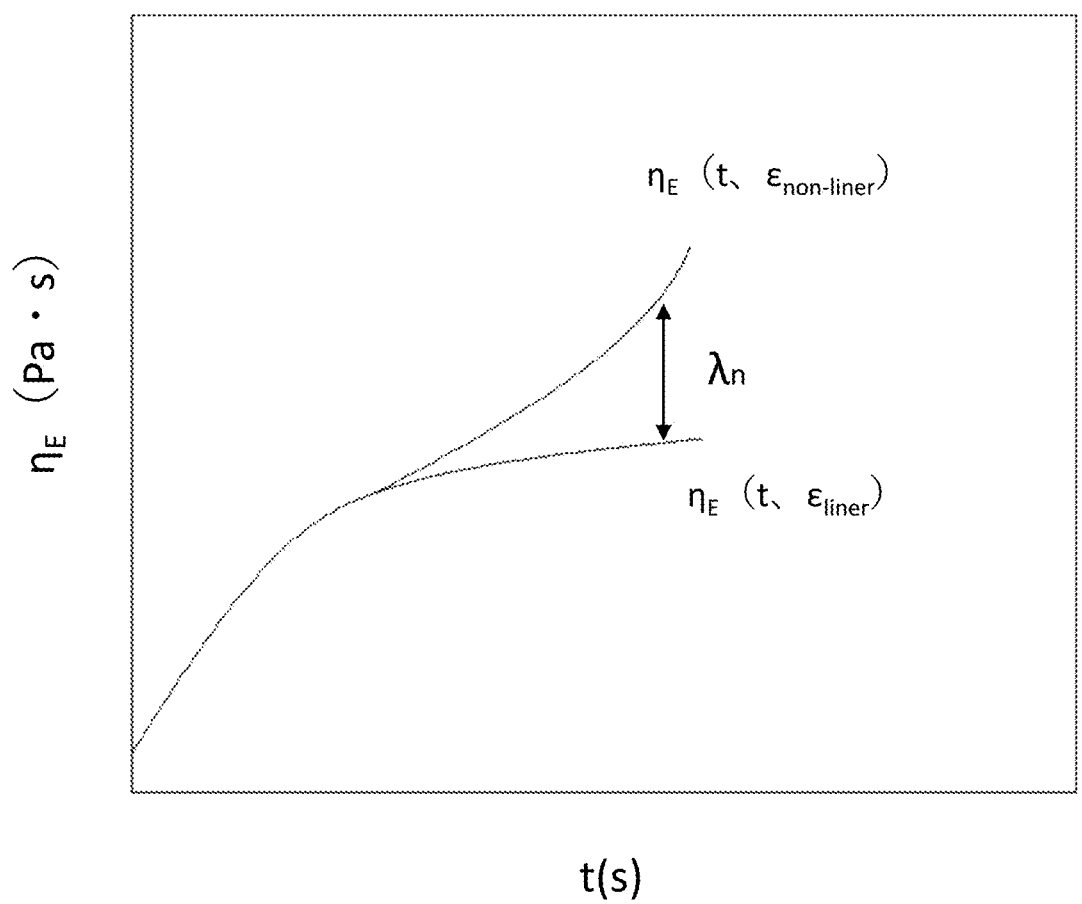
FIG. 1 is a graph showing a method of calculating $\lambda_n$ in the present invention.
Figure 2:
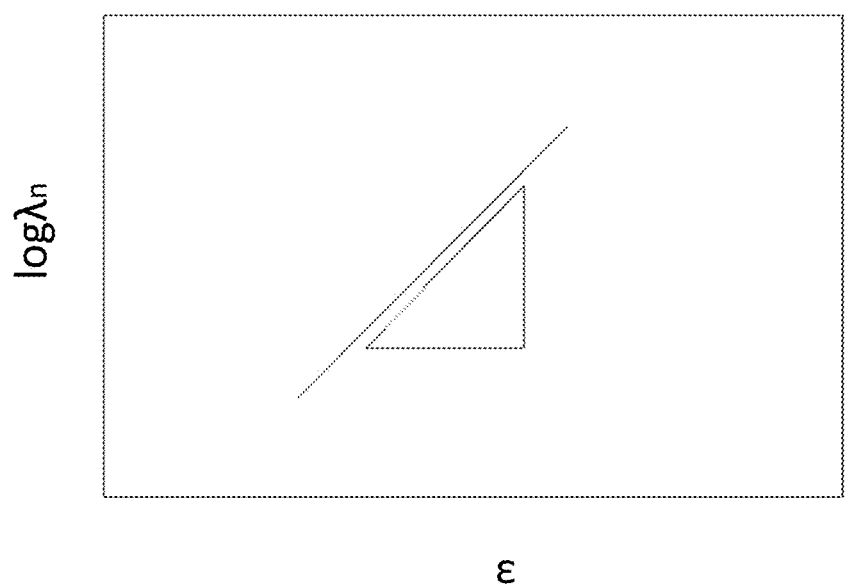
FIG. 2 is a graph showing a method of calculating a strain hardening degree in the present invention.

In the present embodiment, attention is paid to the strain hardening degree as a viscosity parameter related to foam moldability. In the present invention, $\lambda_n$ is calculated from monoaxial elongational viscosity ($\eta_E$) (FIG. 1) by the following formula (1), and a slope obtained when a horizontal axis is strain ($\varepsilon$), and a vertical axis is log $\lambda_n$ is defined as a strain hardening degree (FIG. 2).

$$\lambda_n = \eta_E(t, \varepsilon_{non\text{-}liner})/\eta_E(t, \varepsilon_{liner}) \qquad (1)$$

In the formula (1), $\eta_E$ (t, $\varepsilon_{liner}$) represents a measured value of the elongational viscosity during strain hardening, and $\eta_E$ (t, $\varepsilon_{liner}$) represents a measured value of the elongational viscosity without strain hardening.

In this specification, the monoaxial elongational viscosity $\eta_E$ (t, $\varepsilon_{non\text{-}liner}$) is a value obtained in measurement using ARES-G2 (manufactured by TA INSTRUMENTS) at a strain rate of 1 s$^{-1}$ and a measurement temperature of 180° C. The monoaxial elongational viscosity $\eta_E$(t, $\varepsilon_{liner}$) is a value obtained by measurement using ARES-G2 (manufactured by TA INSTRUMENTS) at a strain rate of 0.1 s$^{-1}$ and a measurement temperature of 180° C.

When the strain hardening degree of contained LDPE is too low, the resin is locally and rapidly stretched during molding, and a pinhole is generated at a stretched portion. The foam molding resin in the present embodiment contains LDPE having the high strain hardening degree to suppress the above-mentioned phenomenon, so that the foam molded article with the high expansion ratio can be obtained.

The strain hardening degree of LDPE is equal to or more than 0.40, more preferably equal to or more than 0.44, and usually equal to or less than 1.0. The strain hardening degree may be, for example, 0.40, 0.41, 0.42, 0.43, 0.44, 0.45, 0.46, 0.47, 0.48, 0.49, 0.50, 0.51, 0.52, 0.53, 0.54, 0.55, 0.56, 0.57, 0.58, 0.59, 0.60, 0.70, 0.80, 0.90, 1.00 or a value between any two of these values.

Melt tension (MT) of LDPE is not particularly limited, and may be, for example, 100 mN, 130 mN, 150 mN, 180 mN, 200 mN, 210 mN, 220 mN, 230 mN, 240 mN, 250 mN, 260 mN, 270 mN, 280 mN, 290 mN, 300 mN, 350 mN, 400 mN, 450 mN, 500 mN, 550 mN, 600 mN or a value between any two of these values.

According to the foam molding resin of the present embodiment, it is possible to select and use an LDPE suitable for producing the molded article having the high expansion ratio from among LDPEs having high resin strength, which have been predicted, in the prior art, to be difficult to achieve the high expansion ratio because MT of LDPE is, for example, 250 mN or more, or 300 mN or more.

In this specification, the melt tension (MT) means tension measured by means of a melt tension tester (manufactured by Toyo Seiki Seisakusho Co., Ltd.) under conditions where a strand is extruded from an orifice having the diameter of 2.095 mm and the length of 8 mm at a test temperature 190° C. and an extrusion speed of 10 mm/min, and then the strand is wound around a roller having a diameter of 80 mm at a winding speed of 16 rpm.

In the present embodiment, shear viscosity of LDPE is not particularly limited and may be 200 Pa·s, 250 Pa·s, 300 Pa·s, 350 Pa·s, 400 Pa·s, 450 Pa·s, 500 Pa·s, or a value between any two of these values.

Previously, it has been predicted that the expansion ratio of LDPE with the shear viscosity of, for example, 300 Pa·s or less, or 350 Pa·s or less is low because resin pressure becomes too low in a foam extruder for kneading the foam molding resin and a foaming agent, which may lead to insufficient dissolving of foaming gas in the foam molding resin. Further, it has been predicted that the expansion ratio of LDPE with the shear viscosity of, for example, 400 Pa·s or more, or 450 Pa·s or more is low because the difference between resin pressure and gas injection pressure is low in the foam extruder for kneading the foam molding resin and the foaming agent, which may prevent the resin from being blended with the gas and thus lower gas dispersibility.

However, according to the foam molding resin of the present embodiment, it is possible, by focusing on LDPE with the strain hardening degree of 0.40 or more, to select and use an LDPE suitable for producing the molded article having the high expansion ratio from among LDPEs which have been predicted, in the prior art, to be difficult to achieve the high expansion ratio.

In this specification, the shear viscosity is a value obtained by measurement at a test temperature of 190° C. and an apparent shear rate of 600/sec according to JIS K-7199.

The melt flow rate (MFR) of LDPE in the present embodiment is not particularly limited and is preferably, for example, 0.2 to 2.5 g/10 minutes, more preferably 0.3 to 2.0 g/10 minutes, even more preferably 0.5 to 1.6 g/10 minutes. In such a case, the expansion ratio tends to be particularly high.

In this specification, the melt flow rate (MFR) is a value obtained by measurement at a test temperature of 190° C. and a test load of 2.16 kg according to JIS K-7210.

The foam molding resin of the present embodiment may be composed only of LDPE or may contain another resin. Examples of the resin other than LDPE include high-density polyethylene (HDPE). This is because the rigidity of the obtained foam molded article can be increased by containing HDPE in the foam molding resin. The mass ratio of LDPE and HDPE is not particularly limited, but is preferably 2:8 to 8:2, more preferably 3:7 to 7:3. When the proportion of HDPE is too small, the rigidity of the foam molded article tends to be low. On the other hand, when the proportion of HDPE is too large, the expansion ratio tends to be low. By using a resin obtained by mixing LDPE and HDPE at the above-mentioned ratio, the foam molded article having high rigidity and high expansion ratio can be obtained.

The physical properties of HDPE are not particularly limited, but preferred values of MFR, shear viscosity, density, and MT are as follows. When HDPE having the following physical properties is used in combination with LDPE, the foam molded article having high rigidity and high foaming ratio can be easily obtained.

MFR: 0.2 to 0.4 g/10 minutes
Shear viscosity: 550 to 650 Pa·s
Density: 0.94 to 0.96 g/cm$^3$
MT: 70 to 200 mN The length in a thickness direction of bubbles formed in the foam molded article is preferably 50 to 100 μm. When the length is less than 50 μm, the expansion ratio tends to be small due to insufficient bubble growth. When the length exceeds 100 μm, pinholes are likely to be generated due to bubble breakage.

2. Method for Producing Foam Molded Article

A method for producing a foam molded article according to an embodiment of the present invention comprises steps of extruding, from a foam extruder, a melt-kneaded resin obtained by melt-kneading the foam molding resin and a foaming agent in the foam extruder to form a foamed parison, and molding the foamed parison to obtain the foam molded article.

The obtained foam molded article can be used, for example for an air conditioning duct of a vehicle.

Figure 3:
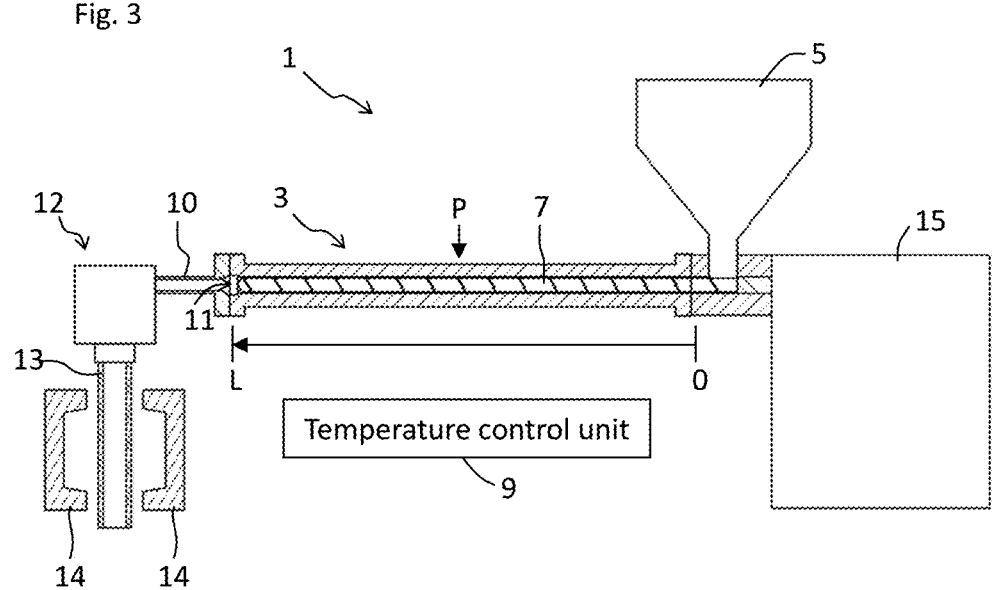
FIG. 3 is a cross-sectional view showing a foam extruder 1 and split molds 14 according to an embodiment of the present invention.

This method can be performed as one example, using a foam extruder 1 and split molds 14 shown in FIG. 3. The foam extruder 1 comprises a cylinder 3, a resin inlet 5, a screw 7, a foaming agent injection port P, a temperature control unit 9, a resin extrusion port 11, and a die head 12.

Hereinafter, each component will be described in detail.

<Resin Inlet 5>

The resin inlet 5 is a so-called hopper, through which raw material resin is input. The form of the raw material resin is not particularly limited, but is typically pellets. The raw material resin is the above-mentioned foam molding resin according to the embodiment of the present invention. The raw material resin is injected into the cylinder 3 from the resin inlet 5 and then heated and melted in the cylinder 3 to become molten resin. Further, the resin is conveyed toward the resin extrusion port 11 provided at one end of the cylinder 3 by the rotation of the screw 7 arranged in the cylinder 3.

<Screw 7>

The screw 7 is arranged in the cylinder 3 and conveys the molten resin toward the resin extrusion port 11 while kneading the molten resin by the rotation thereof. A gear device 15 is provided at one end of the screw 7, and the screw 7 is driven to rotate by the gear device 15. The number of the screw 7 arranged in the cylinder 3 may be one or two or more.

<Foaming Agent Injection Port P>

The cylinder 3 is provided with the foaming agent injection port P for injecting the foaming agent into the cylinder 3. While the position of arranging the foaming agent injection port P is not particularly limited, the foaming agent injection port P is preferably arranged at a position of 0.3 L to 0.7 L (more preferably, 0.4 L to 0.6 L) wherein a position of one end of the cylinder 3 on a side of the resin inlet 5 is represented as 0, and L represents the other end on a side of the resin extrusion port 11. When the foaming agent injection port P is provided at a position of less than 0.3 L from the end on the side of the resin inlet 5, the foaming agent may be injected into the insufficiently kneaded molten resin, and the dispersion of the foaming agent may be insufficient. Further, the temperature of the molten resin is usually controlled so as to gradually decrease toward the resin extrusion port 11. Therefore, when the foaming agent injection port P is provided at a position of more than 0.7 L on the side of the resin extrusion port 11, the temperature of the molten resin at a site where the foaming agent is injected may be too low, so that the amount of the injected foaming agent may decrease.

Examples of the foaming agent injected from the foaming agent injection port P include a physical foaming agent, a chemical foaming agent, and a mixture thereof, and the physical foaming agent is preferable. As the physical foaming agent, an inorganic physical foaming agent, such as air, carbon dioxide gas, nitrogen gas, and water, and an organic physical foaming agent, such as butane, pentane, hexane, dichloromethane, and dichloroethane, and further, a supercritical fluid thereof can be used. As the supercritical fluid, it is preferable to use carbon dioxide, nitrogen or the like. In the case of nitrogen, the supercritical fluid can be obtained at a critical temperature of −149.1° C. or more and a critical pressure of 3.4 MPa or more. In the case of carbon dioxide, the supercritical fluid can be obtained at a critical temperature of 31° C. or more and a critical pressure of 7.4 MPa or more. Examples of the chemical foaming agent include those that can generate carbon dioxide gas by a chemical reaction of an acid (e.g., citric acid or a salt thereof) and a base (e.g., baking soda). Instead of injecting the chemical foaming agent from the foaming agent injection port P, the chemical foaming agent may be injected from the resin inlet 5.

<Temperature Control Unit 9>

The temperature control unit 9 is configured to control the temperature of each part of the cylinder 3 by individually controlling a plurality of temperature adjusting units provided along the cylinder 3. In addition, the temperature control unit 9 can control the temperature of the die head 12 for forming the parison and the temperature of a joint portion 10 between the cylinder 3 and the die head 12.

<Resin Extrusion Port 11, Die Head 12>

Figure 4:
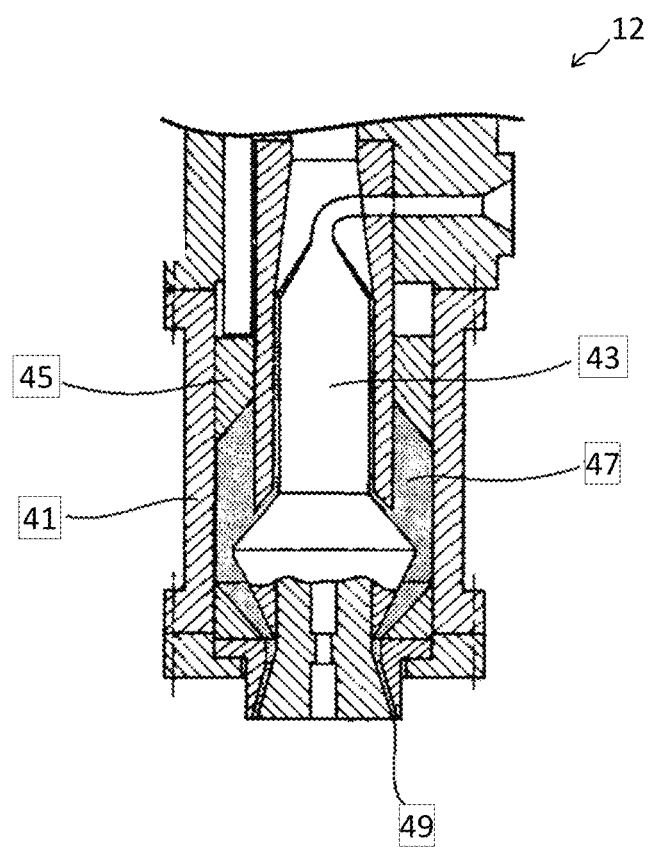
FIG. 4 is a cross-sectional view showing a detailed configuration of a die head 12 in FIG. 1.

The melt-kneaded resin obtained by melt-kneading the raw material resin and the foaming agent is extruded from the resin extrusion port 11 and injected into the die head 12 through the joint portion 10. The die head 12 comprises an outer die cylinder 41 in a cylindrical shape and a mandrel 43 accommodated inside the outer die cylinder 41, as shown in FIG. 4, and is configured to store, inside a space 47 therebetween, the melt-kneaded resin extruded from the cylinder 3. Further, a ring-shaped piston 45 is vertically pushed down after a predetermined amount of the melt-kneaded resin is stored in the space 47, so that the melt-kneaded resin is extruded from a die slit 49 to form a foamed parison 13 in a cylindrical shape. In this regard, although the die head 12 for forming the cylindrical foamed parison 13 is shown here, the die head 12 may be for forming a sheet-shaped foamed parison.

<Split Mold 14>

The foamed parison 13 is guided between a pair of split molds 14. The foam molded article can be obtained by forming the foamed parison 13 by means of the split molds 14. A molding method by means of the split molds 14 is not particularly limited. The method may adopt blow molding in which the foamed parison 13 is molded by blowing air into cavity of the split molds 14, or vacuum molding in which the foamed parison 13 is molded by decompressing the cavity of the split molds 14 from an inner surface of the cavity, and may be adopt a combination thereof.

EXAMPLE

Experimental Example 1

The foam molded article was produced using the foam extruder 1 and the split molds 14 shown in FIG. 3, and foam moldability was evaluated. The inner diameter of the cylinder 3 of the foam extruder 1 was 50 mm, and L/D was 34. As the raw material resin, a mixture of LDPE shown in Table 1 and HDPE (grade: B470, manufactured by Asahi Kasei Chemicals) at a mass ratio of 1:1 was used. The temperature control unit 9 was set so that the temperature of the foamed parison 13 could be 190 to 200° C. The number of rotations of the screw 7 was 60 rmm, and an extrusion rate was 20 kg/hr. $N_2$ gas was used as the foaming agent, and was injected through the foaming agent injection port P provided at a position of 0.5 L. The expansion ratio was adjusted by changing the amount of injected gas.

Blow molding was performed using the foamed parison formed under the above-mentioned conditions to produce a cylindrical foam molded article having the diameter of 50 mm, the height of 100 mm, and the thickness of 5 mm.

For each raw material resin, a plurality of types of foam molded articles produced under the different amounts of injected gas was prepared, and the maximum expansion ratio at which surface roughening due to pinholes and bubble breakage did not occur was determined as the moldable expansion ratio. In the following description, the moldable expansion ratio is simply referred to as the expansion ratio.

Table 1 shows obtained results. Table 1 also shows values of MFR, MT, MFR×MT, strain hardening degree, and shear viscosity. MT, MFR, strain hardening degree, and shear viscosity were measured by the methods described in the embodiment.

TABLE 1

| | LDPE | | MFR | MT | MFR × MT | Strain hardening degree | Shear viscosity (600 Pa · s) | Expansion ratio |
|---|---|---|---|---|---|---|---|---|
| | Grade | Manufacturer | [g/10 min] | [mN] | [mN · g/10 min] | [—] | [Pa · s] | [times] |
| Example 1 | 112A-1 | sinopec | 1.59 | 181.1 | 288 | 0.54 | 433 | 2.8 |
| 2 | 1005FY20 | Reliance | 0.51 | 300.0 | 153 | 0.44 | 454 | 3.0 |
| Comparative 1 | LD100 | Exxonmobil | 1.88 | 80.3 | 151 | 0.38 | 349 | 2.2 |
| Example 2 | PE033 | Repsol | 0.21 | 284.9 | 60 | 0.34 | 541 | 1.8 |
| 3 | F102-0 | Sumitomo Chemical | 0.3 | 191.3 | 57 | 0.33 | 500 | 2.3 |
| 4 | 2601X1 | Sabic | 0.24 | 120.2 | 29 | 0.3 | 435 | 1.6 |
| 5 | PE015 | Repsol | 0.81 | 130.3 | 105 | 0.3 | 428 | 1.9 |

Figure 5:
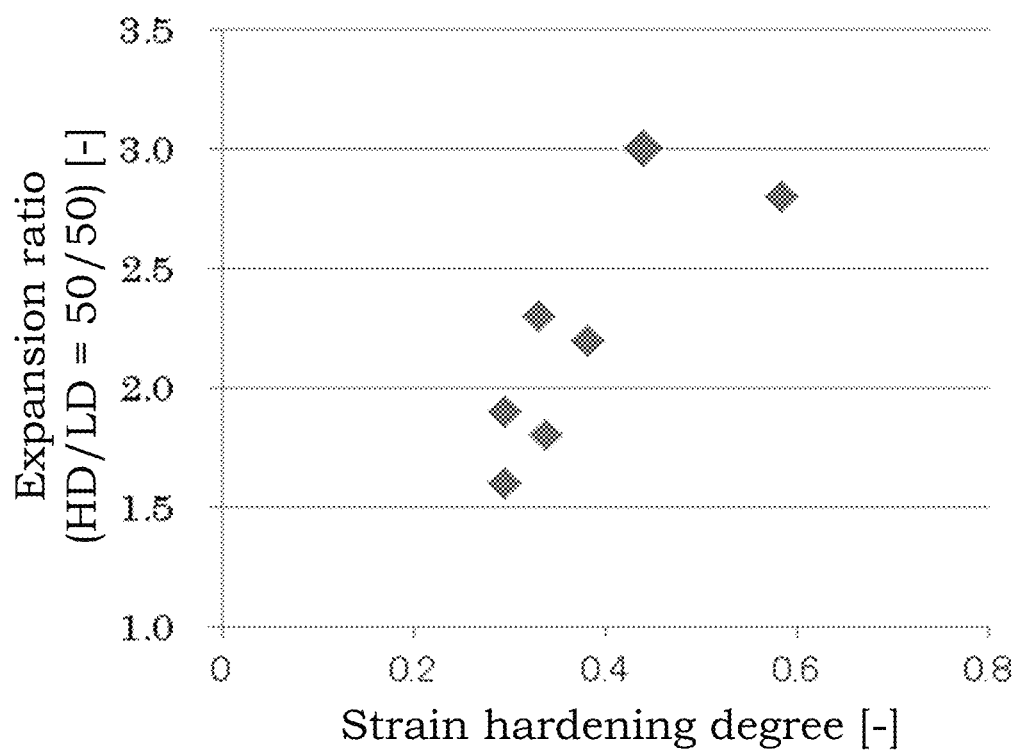
FIG. 5 is a graph plotting a relationship between a strain hardening degree and an expansion ratio in Examples 1 and 2 and Comparative Examples 1 to 5.
Figure 6:
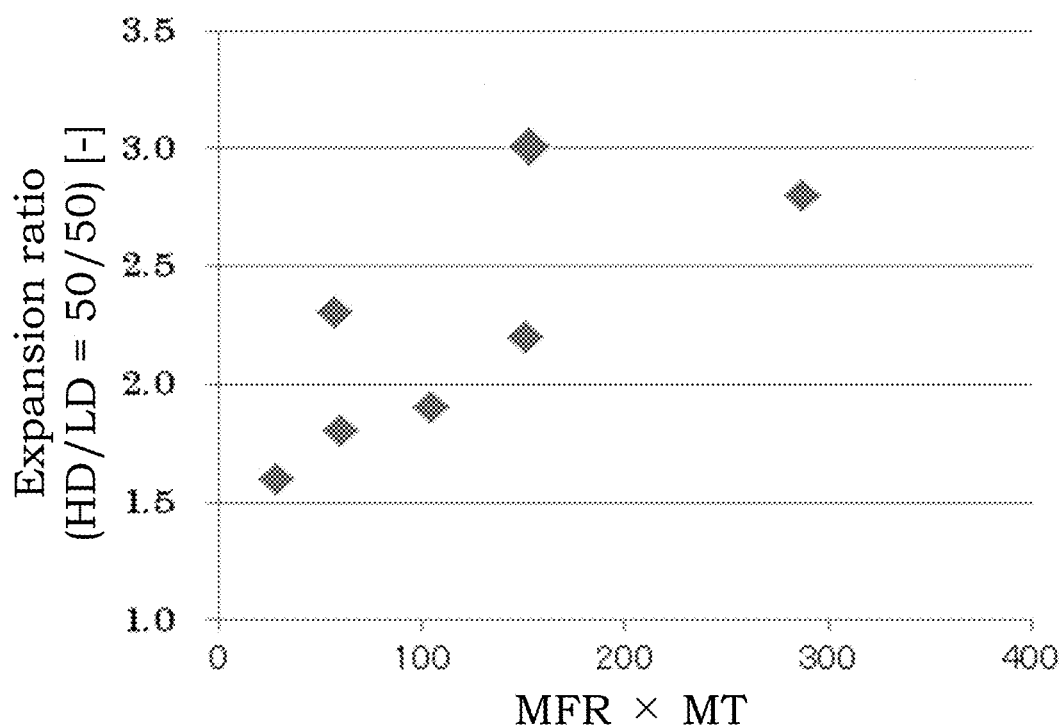
FIG. 6 is a graph plotting a relationship between MFR× MT and the expansion ratio in Examples 1 and 2 and Comparative Examples 1 to 5.

FIG. 5 shows a graph plotting a relationship between the strain hardening degree and the expansion ratio in Examples 1 and 2 and Comparative Examples 1 to 5, and FIG. 6 shows a graph plotting a relationship between MFR×MT and the expansion ratio.

When Examples 1 and 2 and Comparative Examples 1 to 5 are compared, an excellent expansion ratio of 2.5 times or more was achieved in Examples 1 and 2 using LDPE having the strain hardening degree of 0.40 or more. When Example 2 are compared with Comparative Example 1, the value of the expansion ratio is much higher in Example 2 even though the values MFR×MT are almost the same.

Experimental Example 2

In Experimental Example 2, Example 3 in which the mass ratio of LDPE and HDPE was changed to 7:3, and Example 4 in which the mass ratio of LDPE and HDPE was changed to 3:7 were prepared by using LDPE of Example 2 (grade: 1005FY20, manufactured by Reliance), and the moldable expansion ratio was measured. As a result, the moldable expansion ratio was 3.5 times in Example 3 and 2.4 times in Example 4. These results indicate that the expansion ratio of the foam molded article can be increased by using LDPE having the strain hardening degree of 0.40 or more even if the mass ratio between LDPE and HDPE is not 1:1.

REFERENCE SIGN LIST

1: foam extruder, 3: cylinder, 5: resin inlet, 7: screw, 9: temperature control unit, 11: resin extrusion port, 12: die head, 13: foamed parison, 14: split mold, P: foaming agent injection port, 43: mandrel, 45: ring-shaped piston, 47: space, 49: die slit

The invention claimed is:

1. A method for producing a foam molded article by blow molding or vacuum molding, comprising steps of:
    extruding, from a foam extruder, a melt-kneaded resin obtained by melt-kneading a foam molding resin and a foaming agent in the foam extruder to form a foamed parison; and molding the foamed parison by blow molding or vacuum molding to obtain the foam molded article, wherein the foam molding resin contains low-density polyethylene, a strain hardening degree of the low-density polyethylene is equal to or more than 0.40, and melt tension of the low-density polyethylene is equal to or more than 250 mN.

2. The method of claim 1,
    wherein the foam molding resin further contains high-density polyethylene.

3. The method of claim 2,
    wherein a mass ratio of the low-density polyethylene and the high-density polyethylene is 2:8 to 8:2.

4. The method of claim 1,
    wherein shear viscosity of the low-density polyethylene is equal to or more than 450 Pa·s.

5. A method for producing a foam molded article by blow molding or vacuum molding, comprising steps of:
    extruding, from a foam extruder, a melt-kneaded resin obtained by melt-kneading a foam molding resin and a foaming agent in the foam extruder to form a foamed parison; and
    molding the foamed parison by blow molding or vacuum molding to obtain the foam molded article,
    wherein the foam molding resin contains low-density polyethylene,
    a strain hardening degree of the low-density polyethylene is equal to or more than 0.40, and
    shear viscosity of the low-density polyethylene is equal to or more than 450 Pa·s.

6. The method of claim 5,
    wherein the foam molding resin further contains high-density polyethylene.

7. The method of claim 6,
    wherein a mass ratio of the low-density polyethylene and the high-density polyethylene is 2:8 to 8:2.

8. The method of claim 5,
    wherein melt tension of the low-density polyethylene is equal to or more than 250 mN.

* * * * *